(12) United States Patent
Kim (10) Patent No.: US 7,889,302 B2
(45) Date of Patent: Feb. 15, 2011

(54) LIQUID CRYSTAL DISPLAY DEVICE

(75) Inventor: Eun Hong Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 208 days.

(21) Appl. No.: 11/827,406

(22) Filed: Jul. 10, 2007

(65) Prior Publication Data

US 2008/0123013 A1 May 29, 2008

(30) Foreign Application Priority Data

Nov. 29, 2006 (KR) .................... 10-2006-00118898
Jun. 22, 2007 (KR) ...................... 10-2007-0061672

(51) Int. Cl.
*G02F 1/1343* (2006.01)
*G02F 1/1333* (2006.01)

(52) U.S. Cl. .............................. 349/139; 349/54; 349/38

(58) Field of Classification Search ................... 349/38, 349/40, 158, 84, 54, 139
See application file for complete search history.

(56) References Cited

U.S. PATENT DOCUMENTS

| | | | | |
|---|---|---|---|---|
| 5,002,367 A | * | 3/1991 | Nicholas | 349/54 |
| 5,136,407 A | * | 8/1992 | Clerc | 349/146 |
| 5,459,410 A | * | 10/1995 | Henley | 324/770 |
| 5,909,035 A | * | 6/1999 | Kim | 257/59 |
| 6,043,971 A | * | 3/2000 | Song et al. | 361/111 |
| 6,052,167 A | * | 4/2000 | Song | 349/139 |
| 6,642,914 B1 | * | 11/2003 | Andrews | 345/87 |
| 6,734,925 B1 | * | 5/2004 | Lee et al. | 349/40 |
| 7,317,602 B2 | * | 1/2008 | Lai | 361/56 |
| 2003/0117536 A1 | * | 6/2003 | Jeon | 349/40 |
| 2007/0002204 A1 | * | 1/2007 | Kim et al. | 349/54 |
| 2007/0013631 A1 | * | 1/2007 | Yang | 345/96 |

* cited by examiner

*Primary Examiner*—Mark A Robinson
*Assistant Examiner*—Robert Tavlykaev
(74) *Attorney, Agent, or Firm*—Brinks Hofer Gilson & Lione (57) ABSTRACT

An LCD device is disclosed, to prevent a connection caused by pressing a sealant between a common voltage line and a inspection line by removing a predetermined portion of common voltage transmission line at a crossing portion of the common voltage transmission line and the inspection line, a substrate including a plurality of pixel regions defined by a plurality of gate and data lines crossing each other; an auxiliary voltage transmission line supplying an auxiliary voltage to one terminal of auxiliary capacitor formed in the pixel region; a common voltage transmission line supplying a common voltage to the plurality of the pixel regions through a common electrode; an inspection line connected to the auxiliary voltage transmission line by crossing the common voltage transmission line; a sealant positioned above the inspection line; and wherein a predetermined portion of the common voltage transmission line is removed from the crossing portion of the inspection line and the common voltage transmission line.

12 Claims, 7 Drawing Sheets

FIG. 2

[Corrected Fig.2]

LIQUID CRYSTAL DISPLAY DEVICE

This application claims the benefit of Korean Patent Application both Nos. 10-2006-118898 filed on Nov. 29, 2006 and 10-2007-61672 filed on Jun. 22, 2007 which are hereby incorporated by reference.

BACKGROUND

1. Field of the Invention

Embodiments of the present invention relate to a liquid crystal display (LCD) device, and more particularly, to an LCD device that prevents a short-circuit that may occur between a common voltage transmission line and an inspection line when a sealant applies pressure against the inspection line through one or more separating layers. A short-circuit is avoided by removing or omitting a predetermined portion of common voltage transmission line in a region where the common voltage transmission line and the inspection line cross.

2. Discussion of the Related Art

Recently, various flat panel display devices have been developed, such as liquid crystal display devices (LCD), field emission displays (FED), plasma display panels (PDP), and light emitting displays (LED). Among the above-mentioned flat panel display devices, the LCD device is used most widely because of its advantageous properties, such as low power consumption, thin profile and lightness in weight. Such LCD devices provide a substitute for the cathode ray tube (CRT). In addition to mobile-type LCD devices associated with notebook-type computers, the LCD device has been developed for computer monitors and televisions to receive and display broadcast signals.

Despite various technical developments in the LCD technology, which may have application in different fields, research in enhancing the picture quality of the LCD device has been lacking compared to other features and advantages of the LCD device. In order to use the LCD device in various environments as a general purpose display, the key to developing the LCD device depends on whether the LCD device can display a high quality picture, while still maintaining a low weight, thin profile, and low power consumption.

The LCD device includes an LCD panel to display images, and a driving unit to apply a driving signal to the LCD panel, where the LCD panel includes lower and upper substrates, and a liquid crystal layer formed between the lower and upper substrates. The lower substrate (TFT array substrate) includes a plurality of gate lines arranged at fixed intervals in a first direction, a plurality of data lines arranged at fixed intervals in a second direction perpendicular to the first direction, and a plurality of pixel electrodes formed as a matrix configuration in respective pixel regions defined by the plurality of gate and data lines. Also included are a plurality of thin film transistors activated by signals provided by the gate lines (GL) so as to transmit signals outputted from the data lines (DL) to the respective pixel electrodes.

On the edge of the lower substrate, a common voltage transmission line is formed to transmit a common voltage, wherein the common voltage transmission line is electrically connected to a common electrode of upper substrate. The upper substrate (color filter substrate) includes a black matrix layer to prevent light from leaking to other portions except the pixel regions, and an R/G/B color filter layer provides the various colors. A common electrode is also provided.

The lower and upper substrates are maintained with a fixed gap therebetween by spacers, and the lower and upper substrates are bonded to each other. A liquid crystal layer is formed between the lower and upper substrates.

The pixel region includes a liquid crystal capacitor including a pixel electrode, the common electrode, and the liquid crystal layer disposed between the pixel electrode and the common electrode. In addition, an auxiliary capacitor is formed in the pixel region, wherein the auxiliary capacitor allows an electric charge to be maintained in the liquid crystal capacitor for one frame. The auxiliary capacitor includes an auxiliary line overlapped with a predetermined portion of pixel electrode. The auxiliary line is supplied with an auxiliary voltage from an auxiliary voltage transmission line.

Before bonding the lower and upper substrates to each other in the above-mentioned LCD device, it is necessary to inspect the lower substrate to detect short-circuits and open-circuits in the signal lines, namely, the gate lines, the data lines, and the auxiliary voltage transmission line. This inspection process uses a mass production system (MPS) inspection apparatus.

Figure 1:
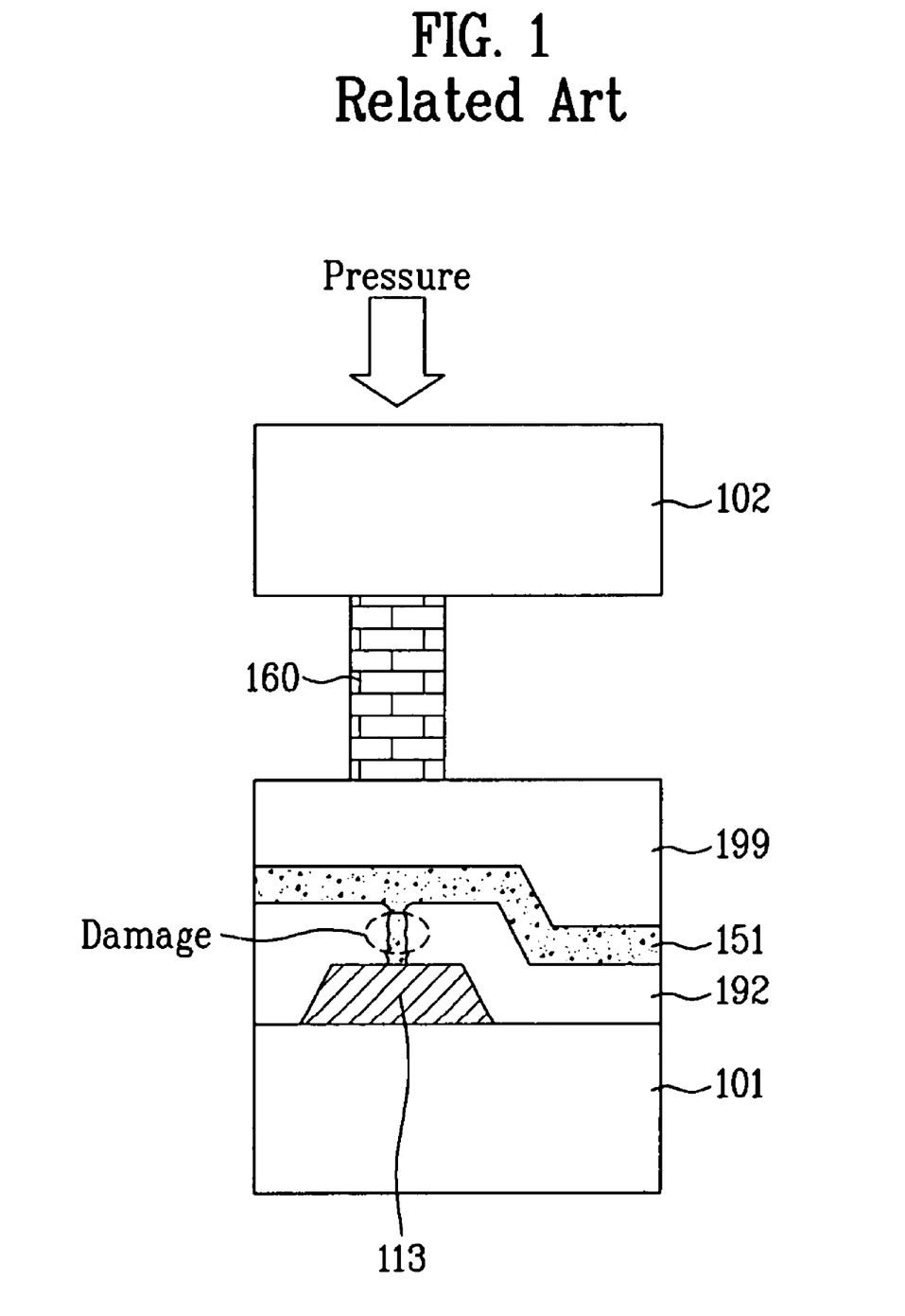
FIG. 1 is a cross sectional view of illustrating a short circuit inspection between an auxiliary voltage transmission line and gate lines.

Disconnection or open-circuit inspection between the auxiliary voltage transmission line and the gate line is explained as follows: FIG. 1 is a cross sectional view illustrating the short-circuit inspection between the auxiliary voltage transmission line and the gate line.

As shown in FIG. 1, in order to apply a signal to an auxiliary voltage transmission line (not shown), the auxiliary voltage transmission line is connected to an inspection line 151 to supply an auxiliary voltage. The inspection line 151 is extended to an edge of the lower substrate 101, and is then connected to an In Line Process Test-Mass Production System (IPT-MPS) inspection apparatus. Also, the gate lines (not shown) are connected to the IPT-MPS inspection apparatus through an additional inspection line 151.

Through the IPT-MPS inspection apparatus, signals are supplied to the auxiliary voltage transmission line and gate line. A resistance is measured to determine whether the auxiliary voltage transmission line is disconnected from the gate line.

If there is no fault, the lower and upper substrates 101 and 102 are bonded to each other, and liquid crystal material is injected into a space between the lower and upper substrates 101 and 102, thereby completing the LCD device. After bonding the lower and upper substrates 101 and 102, the auxiliary voltage transmission line should not be in electrical communication with a common voltage transmission line 113, as explained below.

On or near the edge of lower substrate 101, there is a common voltage transmission line 113. To connect the inspection line 151 to the auxiliary voltage transmission line, the inspection line 151 necessarily crosses the common voltage transmission line 113.

The lower substrate 101 and the upper substrate 102 are bonded to each other by a sealant 160, wherein the sealant 160 is formed along the edges of lower substrate 101. The sealant 160 is positioned above the common voltage transmission line 113. Between the common voltage transmission line 113 and the sealant 160, there is a gate insulation layer 192, the inspection line 151 and a passivation layer 199, which are deposited sequentially.

The sealant 160 positioned between the lower substrate 101 and the upper substrate 102 is pressed down by a pressure generated when bonding the lower and upper substrates 101 and 102 to each other. Glass fibers in the sealant transmit the applied pressure to the passivation layer 199 and the inspection line 151. Accordingly, the gate insulation layer 192 positioned between the inspection line 151 and the common voltage transmission line 113 may be damaged due to the transmitted pressure.

Thus, the common voltage transmission line 113 may be exposed through the damaged portion of gate insulation layer 192, and may contact the inspection line 151. This causes a short circuit between the common voltage transmission line 113 and the inspection line 151. The inspection line 151 is, in turn, connected to the auxiliary voltage transmission line. Thus, the common voltage transmission line 113 is connected to the auxiliary voltage transmission line by the short circuit.

SUMMARY

Accordingly, embodiments of the present invention are directed to an LCD device that substantially overcomes one or more problems due to limitations and disadvantages of the related art.

In a first aspect, a substrate including a plurality of pixel regions defined by a plurality of gate and data lines crossing each other; an auxiliary voltage transmission line supplying an auxiliary voltage to one terminal of auxiliary capacitor formed in the pixel region; a common voltage transmission line supplying a common voltage to the plurality of the pixel regions through a common electrode; an inspection line connected to the auxiliary voltage transmission line by crossing the common voltage transmission line; a sealant positioned above the inspection line; and wherein a predetermined portion of the common voltage transmission line is removed from the crossing portion of the inspection line and the common voltage transmission line.

In a second aspect, a substrate including a plurality of pixel regions defined by a plurality of gate and data lines crossing each other; an auxiliary voltage transmission line supplying an auxiliary voltage to one terminal of auxiliary capacitor formed in the pixel region; an inspection line connected to the auxiliary voltage transmission line by crossing the common voltage transmission line; a common voltage transmission line supplying a common voltage to the plurality of the pixel regions through a common electrode, wherein predetermined portion of the common voltage transmission line is removed from the portion where the common voltage transmission line and the inspection line cross, a contact electrode connecting the removed portion a sealant positioned above the contact electrode, wherein a predetermined portion of the inspection line is removed from the crossing portion of the inspection line and the contact electrode.

In a third aspect, a liquid crystal display (LCD) device comprising: a plurality of gate lines and data lines formed on a first substrate, each of the gate lines and data lines defining a pixel region; a common voltage transmission line in electrical communication with a common electrode; an auxiliary capacitor formed in the pixel region; an auxiliary voltage transmission line in electrical communication with the respective auxiliary capacitors; and an inspection line in electrical communication with the auxiliary voltage transmission line, the inspection line and the common voltage transmission line crossing each other in planes separated by a gate insulating layer so as to define a crossing region; wherein a portion of the common voltage-transmission line in the crossing region is removed or omitted.

In a fourth aspect, a liquid crystal display (LCD) panel comprising: an upper substrate, and a lower substrate opposite the upper substrate; a layer of liquid crystal material disposed between the upper and lower substrate; a common electrode formed on the upper substrates; a plurality of gate lines disposed on the lower substrate in a first direction, and a plurality of data lines disposed on the lower substrate in a second direction substantially perpendicular to the first direction, wherein each of the gate lines and the data lines define a pixel region; an auxiliary capacitor formed in the pixel region; an auxiliary voltage transmission line in electrical communication with the auxiliary capacitor, and a common voltage transmission line in electrical communication with the common electrode; an inspection line in electrical communication with the auxiliary voltage transmission line and configured to provide an auxiliary voltage to the auxiliary voltage transmission line, the inspection line and the common voltage transmission line crossing each other in planes separated by a gate insulating layer so as to define a crossing region; and wherein a portion of the common voltage transmission line in the crossing region is removed or omitted and the gate insulating layer is disposed in the omitted portion of the common voltage transmission line.

In a fifth aspect, a liquid crystal display (LCD) device comprising: a plurality of gate lines and data lines formed on a first substrate, each of the gate lines and data lines defining a pixel region; a common voltage transmission line in electrical communication with a common electrode; an auxiliary capacitor formed in the pixel region; an auxiliary voltage transmission line in electrical communication with the respective auxiliary capacitors; and an inspection line in electrical communication with the auxiliary voltage transmission line, the inspection line and the common voltage transmission line crossing each other in planes separated by a gate insulating layer so as to define a crossing region, wherein predetermined portion of the common voltage transmission line is removed from the portion where the common voltage transmission line and the inspection line cross; a contact electrode connecting the removed portion of the common voltage transmission line; and wherein a portion of the inspection line in the crossing region is removed or omitted.

In a sixth aspect, a liquid crystal display (LCD) panel comprising: an upper substrate, and a lower substrate opposite the upper substrate; a layer of liquid crystal material disposed between the upper and lower substrate; a common electrode formed on the upper substrates; a plurality of gate lines disposed on the lower substrate in a first direction, and a plurality of data lines disposed on the lower substrate in a second direction substantially perpendicular to the first direction, wherein each of the gate lines and the data lines define a pixel region; an auxiliary capacitor formed in the pixel region; an auxiliary voltage transmission line in electrical communication with the auxiliary capacitor, and a common voltage transmission line in electrical communication with the common electrode; an inspection line in electrical communication with the auxiliary voltage transmission line and configured to provide an auxiliary voltage to the auxiliary voltage transmission line, the inspection line and the common voltage transmission line crossing each other in planes separated by a gate insulating layer so as to define a crossing region, wherein predetermined portion of the common voltage transmission line is removed from the portion where the common voltage transmission line and the inspection line cross; a contact electrode connecting the removed portion of the common voltage transmission line; and wherein a portion of the inspection line in the crossing region is removed or omitted and the gate insulating layer is disposed in the omitted portion of the inspection line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to exemplary embodiments of the present invention, which are illustrated in the accompanying drawings. Wherever possible, the same reference numbers will be used throughout the drawings to refer to the same or like parts. Hereinafter, an LCD device according to an embodiment of the present invention will be described with reference to the accompanying drawings.

Figure 2:
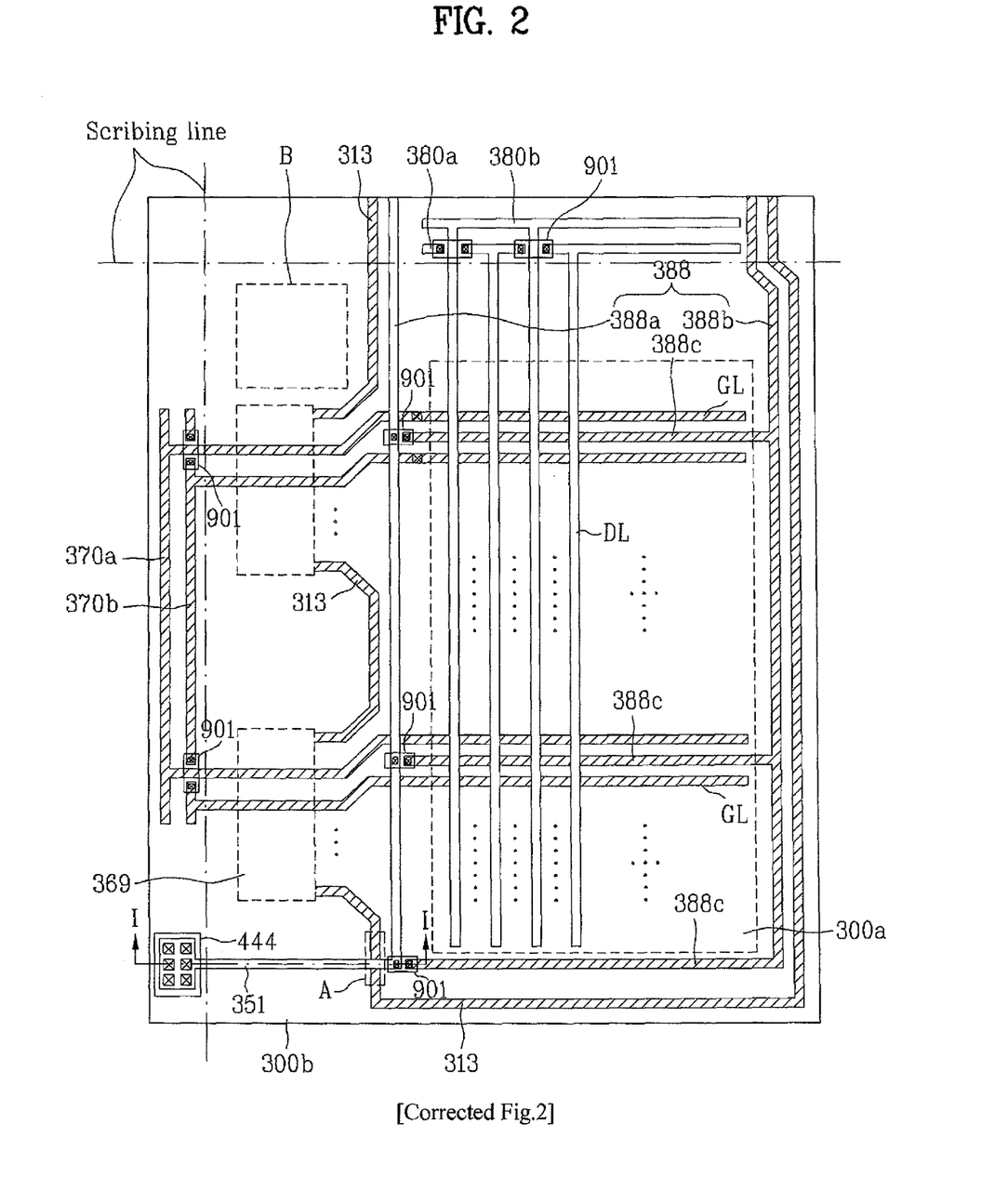
FIG. 2 is a plan view illustrating a lower substrate of an LCD device according to first embodiment.
Figure 3:
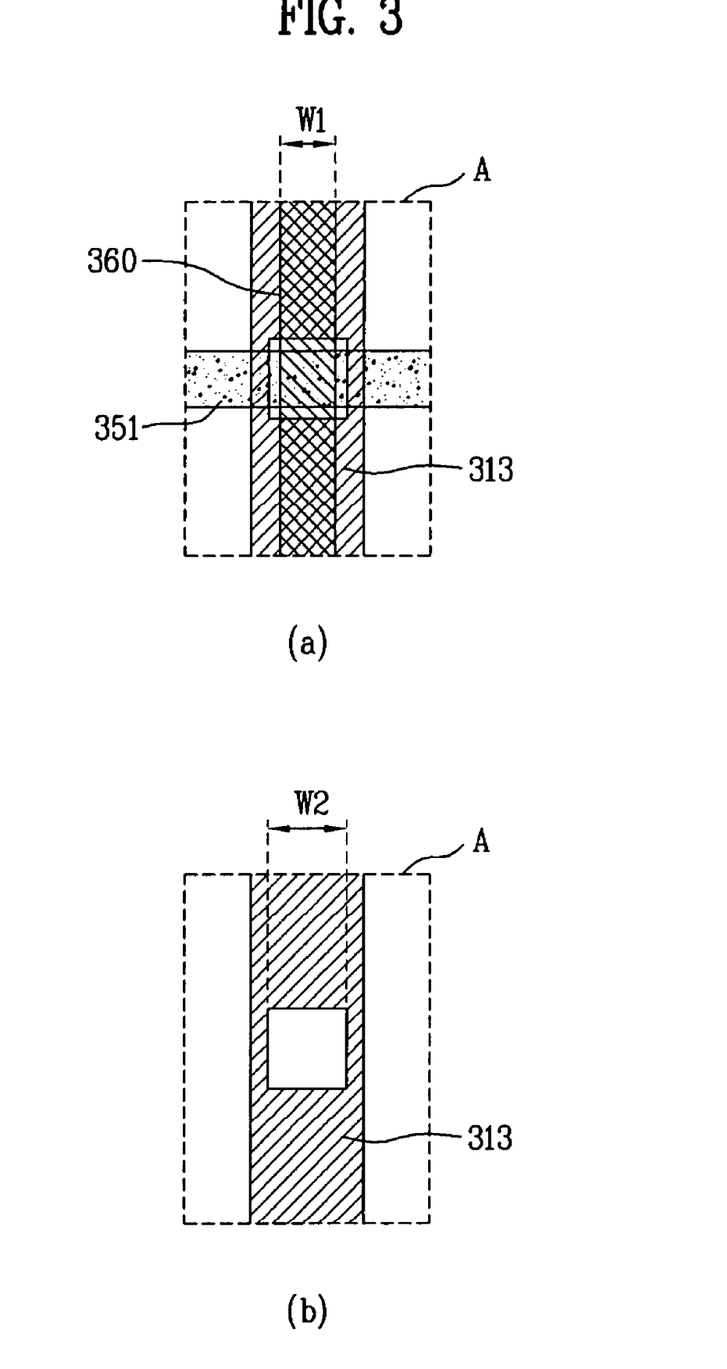
FIG. 3 is a plan view illustrating a common voltage transmission line in "A" of FIG. 2.

FIG. 2 is a plan view illustrating a lower substrate of an LCD device according to first embodiment. FIG. 3 is a plan view illustrating a common voltage transmission line in "A" of FIG. 2.

As shown in FIG. 2, a lower substrate of LCD device according to first embodiment includes a display area 300a configured to display images, and a non-display area 300b formed near the display area 300a. Although not shown, an upper substrate is provided opposite to the lower substrate, and the lower and upper substrates are bonded to each other by a sealant to complete the LCD device.

On the display area 300a of lower substrate, there are a plurality of gate lines (GL) arranged at fixed intervals in a first direction and a plurality of data lines (DL) arranged at fixed intervals in a second direction perpendicular to the first direction. Also included are a plurality of pixel electrodes formed as a matrix in respective pixel regions defined by the plurality of gate (GL) and data (DL) lines. A plurality of thin film transistors are switched based on signals outputted from the gate lines (GL) so as to transmit signals outputted from the data lines (DL) to the respective pixel electrodes.

Although not shown, the upper substrate (color filter substrate) includes a black matrix layer to prevent light from leaking on other portions except the pixel regions, an R/G/B color filter layer to display various colors, and a common electrode to realize images.

The lower and upper substrates are maintained with a fixed gap therebetween by spacers, and the lower and upper substrates are bonded to each other by the sealant. A liquid crystal layer is formed between the lower and upper substrates.

A auxiliary voltage transmission line 388 is formed in the lower substrate. The auxiliary voltage transmission line 388 includes first auxiliary line 388a positioned in the one edge of the lower substrate, second auxiliary line 388b positioned in the another edge of the lower substrate, and a plurality of third auxiliary lines 388c connecting between the first auxiliary line 388a and second auxiliary line 388b.

The first auxiliary line 388a, the second auxiliary line 388b and a lowermost third auxiliary line 388c are formed in the boundaries between the display area 300a and the non-display area 300b.

The first auxiliary line 388a and the inspection line 351 are formed of the same material. The second auxiliary line 388b, the third auxiliary lines 388c, and the common voltage transmission line 313 are formed of the same material. The first auxiliary line 388a and the second auxiliary line 388b are formed of different material. That is, the first auxiliary line 388a and the inspection line 351 are in one united body. The second auxiliary line 388b, third auxiliary lines 388c and the common voltage transmission line 313 are in one united body.

The first auxiliary line 388a and the inspection line 351 are formed of the same material as that of the data line. The second auxiliary line 388b, third auxiliary lines 388c and the common voltage transmission line 313 are formed of the same material as that of the gate line.

A contact electrode connects between the inspection line 351 and the third auxiliary lines 388c. The contact electrode 901 is formed of the same material as that of the pixel electrode.

The pixel region includes a liquid crystal capacitor with the pixel electrode, the common electrode, and the liquid crystal layer positioned between the pixel electrode and the common electrode. In addition, an auxiliary capacitor is formed in the pixel region, wherein the auxiliary capacitor allows electric charges to be maintained in the liquid crystal capacitor for one frame. The one terminal of the auxiliary capacitor is connected with the third auxiliary line 388c overlapped with a predetermined portion of pixel electrode. The third auxiliary lines 388c are formed between each of the gate lines (GL).

A common voltage transmission line 313 is formed at one side of the auxiliary voltage transmission line 388 in the non-display area 300b. The common voltage transmission line 313 transmits a common voltage to the common electrode formed on the upper substrate. The common voltage transmission line 313 and the common electrode are electrically connected to each other by one or more silver dots (Ag dot).

The common voltage transmission line 313 is formed on the lower substrate by a line-on-glass (LOG) process. The common voltage transmission line 313 surrounds the auxiliary voltage transmission line 388, and the common voltage transmission line 313 has a disconnected portion. The disconnected portion of common voltage transmission line 313 is extended to a TCP (Tape Carrier Package) region 369 occupied by a Tape Carrier Package adhered to the lower substrate. On the TCP, there is a gate driver IC to drive the gate lines (GL), and a connection line to connect the disconnected portion of common voltage transmission line 313.

One end of each of the gate lines (GL) is extended to the non-display area 300b, and one end of each of the data lines (DL) is extended to the non-display area 300b.

Among the plurality of the gate lines (GL), the odd-numbered gate lines (GL) are connected to first gate shorting bar 370a. Similarly, the even-numbered the gate lines (GL) are connected to a second gate shorting bar 370b.

Among the plurality of data lines (DL), the odd-numbered data lines (DL) are connected to one odd-numbered data shorting bar 380a. Also, the even-numbered data lines (DL) are connected to one even-numbered data shorting bar 380b.

The gate line (GL), the first gate shorting bar 370a, and the second gate shorting bar 370b are formed of the same material. Predetermined portion of the second gate shorting bar 370b is removed from the portion where the second gate shorting bar 370b and the odd-numbered gate line (GL) cross. The removed portions are connected to each other with the contact electrode 901.

The data line (DL), the first data shorting bar 380a, and the second data shorting bar 380b are formed of the same material. Predetermined portion of the second data shorting bar 380b is removed from the portion where the second data shorting bar 380b and the odd-numbered data line (DL) cross. The removed portions are connected to each other with the contact electrode 901.

In order to apply the signal to the auxiliary voltage transmission line 388, the auxiliary voltage transmission line 388 is connected to an inspection line 351 to supply an auxiliary voltage. The inspection line 351 is extended to the margin of lower substrate, and is then connected to an IPT-MPS inspection apparatus. Note that a region labeled as "B" (not discussed herein) corresponds to the portion having lines of LOG type.

The common voltage transmission line 313 and the auxiliary voltage transmission line 388 are formed of the same material as that of the gate line (GL), while the inspection line 351 is formed of the same material as that of the data line (DL). The common voltage transmission line 313 is formed in the margin of lower substrate. In order to connect the inspection line 351 to the auxiliary voltage transmission line 388, the inspection line 351 must cross the common voltage transmission line 313.

The lower substrate and the upper substrate are bonded to each other by the sealant. The sealant is formed along the edges of lower substrate. Also, the sealant is positioned above the common voltage transmission line 313. Between the common voltage transmission line 313 and the sealant, there is a non-conducting layer. The non-conducting layer may include at least one of a gate insulation layer, or a passivation layer, which may be deposited sequentially. The inspection line 351 is formed adjacent the non-conducting layer. For example, the inspection line 351 may be formed between the gate insulation layer and the passivation layer.

As explained in the related art section, when bonding the lower and upper substrates to each other, the gate insulation layer may be damaged due to pressure of the sealant. Thus, there may be the short circuit between the common voltage transmission line 313 and the inspection line 351 due to the damaged gate insulation layer. FIG. 3a shows the common voltage transmission line, the inspection line 351 and the sealant 360, and FIG. 3b shows the common voltage transmission line 313 with a portion removed. As shown in FIGS. 3a and 3b, a predetermined portion of common voltage transmission line 313 is removed (or omitted during formation of the common voltage transmission line 313) from the portion where the common voltage transmission line 313 and the inspection line 351 cross, so as to prevent the short circuit between the inspection line 351 and the common voltage transmission line 313. Preferably, a width (W2) of removed portion is larger than a width (W1) of sealant 360 to prevent the short circuit between the inspection line 351 and the common voltage transmission line 313.

Figure 4:
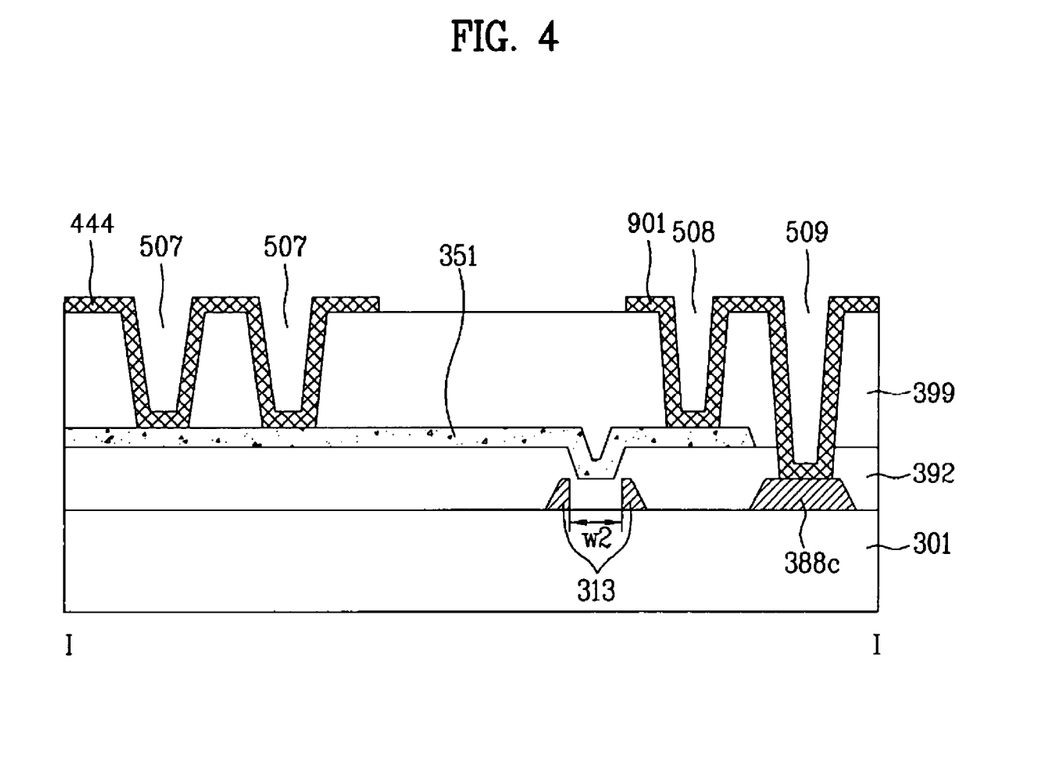
FIG. 4 is a cross sectional view along line I-I of FIG. 3.

FIG. 4 is a cross sectional view along line I-I of FIG. 2. As shown in FIG. 4, the predetermined portion of common voltage transmission line 313 is removed or omitted and is filled with the gate insulation layer 392. Then, the inspection line 351 is formed above the gate insulation layer 392. The inspection line 351 is formed on the gate insulation layer 392. The inspection line 351 is connected with the lowermost third line 388c through contact holes 508, 509, wherein the contact hole 508 exposes the inspection line 351 and the contact hole 509 exposes the lowermost third auxiliary line 388c.

There are a plurality of contact holes 507 in the passivation layer 399 which covers the inspection line 351 positioned at the end of non-display area 300b. The contact holes 507 expose the predetermined portion of inspection line 351. Through the contact holes 507, the inspection line 351 is electrically connected to a pad electrode 444. The pad electrode 444 is connected to the IPT-MPS inspection apparatus. Also, the pad electrode 444 is formed of the same material as that of pixel electrode formed in the pixel region, for example, Indium Tin Oxide (ITO).

Figure 5:
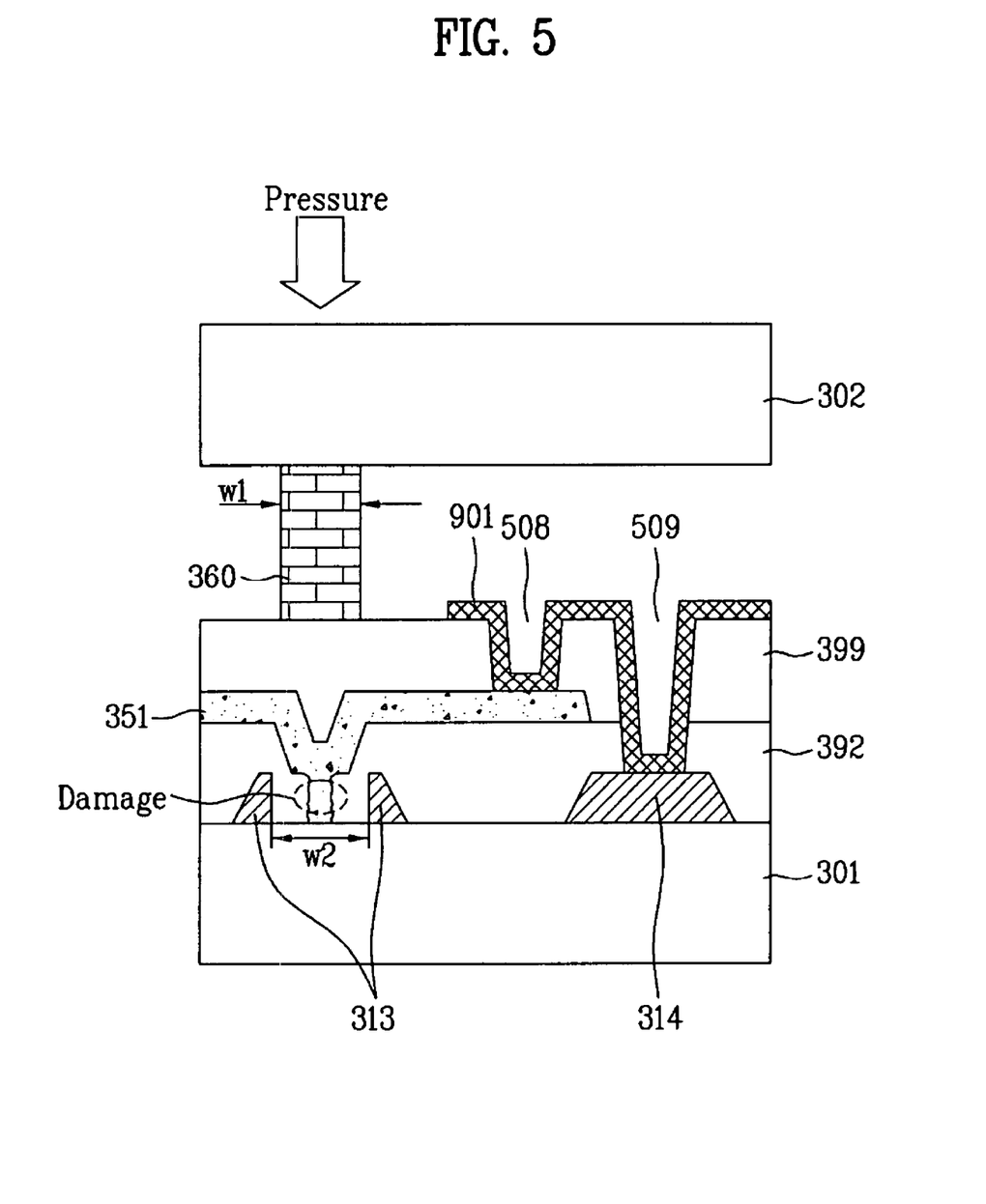
FIG. 5 is a cross sectional view of showing a short circuit prevention effect by a common voltage transmission line according to first embodiment.

FIG. 5 is a cross sectional view showing prevention of the short-circuit according to the disclosed embodiment. Referring to FIG. 5, the sealant 360 is pressed down by the pressure generated when bonding the lower and upper substrates 301 and 302 to each other. The glass fibers in the sealant 360 transmit the applied pressure to the passivation layer 399 and in turn, to the inspection line 351. Accordingly, the gate insulation layer 392 positioned between the inspection line 351 and the common voltage transmission line 313 may be damaged due to the transmitted pressure. Accordingly a predetermined portion of inspection line 351 may be exposed through the damaged portion of gate insulation layer 392. However, because the common voltage transmission line 313 is not formed in the damaged portion of gate insulation layer 392, it is possible to prevent the short circuit between the common voltage transmission line 313 and the inspection line 351.

Each of the shorting bars 370a, 370b, 380a and 380b formed on the lower substrate 301 is removed by a scribing process to cut the lower substrate 301 along a scribing line. The edge of cut lower substrate 301 is ground by a grinding process.

As mentioned above, the LCD device according to the invention has the following advantages. In the LCD device according to the disclosed embodiment, the predetermined portion of common voltage transmission line 313 is removed from the crossing portion of the common voltage transmission line 313 and the inspection line 351, to prevent the short circuit that may be caused by the pressure of sealant 360 against the common voltage transmission line 313 and the inspection line 351.

Figure 6:
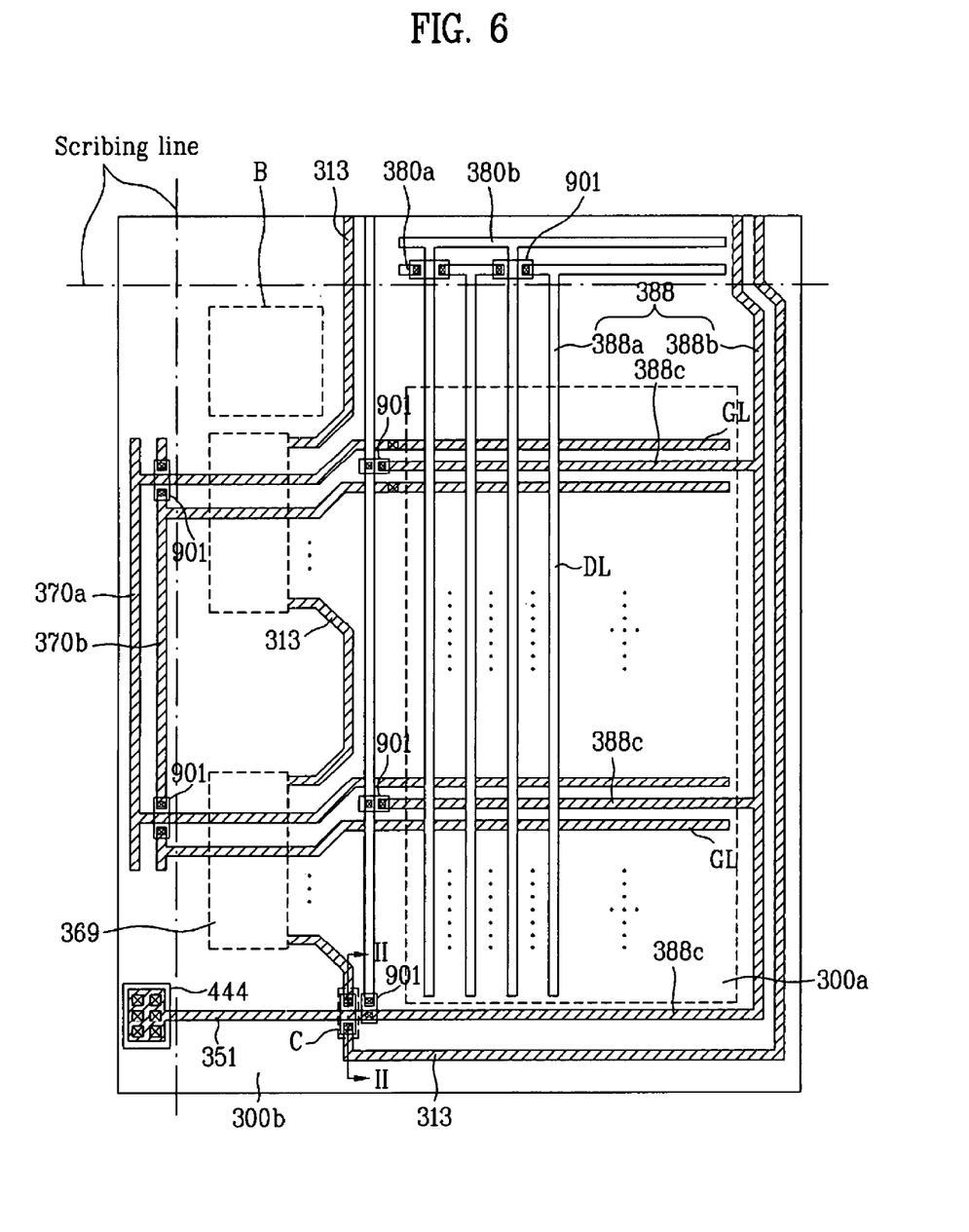
FIG. 6 is a plan view illustrating a lower substrate of an LCD device according to second embodiment.
Figure 7:
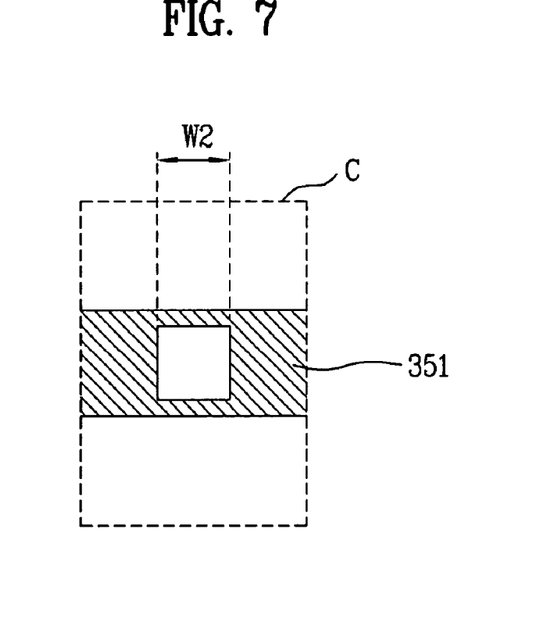
FIG. 7 is a plan view illustrating a common voltage transmission line in "C" of FIG. 6.
Figure 8:
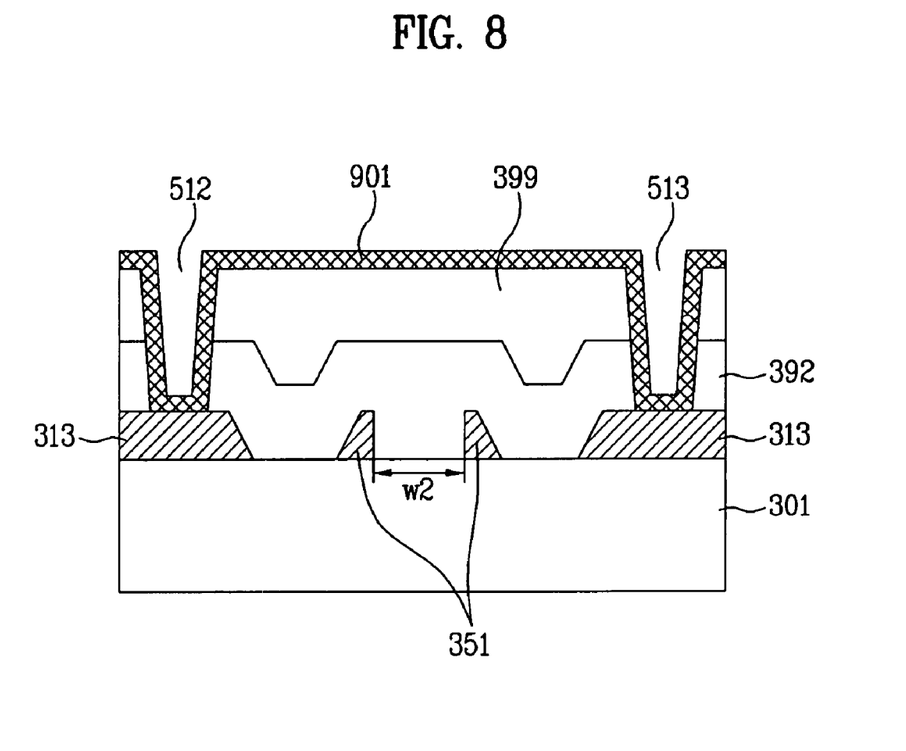
FIG. 8 is a cross sectional view along line 11-11 of FIG. 6.

FIG. 6 is a plan view illustrating a lower substrate of an LCD device according to second embodiment; FIG. 7 is a plan view illustrating a common voltage transmission line in "C" of FIG. 6. FIG. 8 is a cross sectional view along line II-II of FIG. 6.

According to the FIG. 6, a second auxiliary line, a inspection line 351, plurality of third auxiliary line 388c, and a common voltage transmission line 313 are formed of the same material. The first auxiliary line 388a and second auxiliary line 388b are formed of different material. Predetermined portion of the common voltage transmission line 313 is removed from the portion where the common voltage transmission line 313 and the inspection line 351 cross. The removed portions are connected to each other with the contact electrode 901.

The second auxiliary line 388b, the inspection line 351 and plurality of third auxiliary lines 388c, and the common voltage transmission line 313 are formed of the same material as that of the gate line (GL). The first auxiliary line 388a is formed of the same material as that of data line (DL).

The contact electrode 901 and the inspection line 351 may be connected to each other due to the problem as explained above. As shown in FIGS. 7 and 8, a predetermined portion of the inspection line is removed (or omitted during formation of the common voltage transmission line 313) from the portion where the common voltage transmission line 313 and the inspection line 351 cross, so as to prevent the short circuit between the inspection line 351 and the common voltage transmission line 313. Preferably, a width (W2) of removed portion is larger than a width (W1) of sealant 360 to prevent the short circuit between the inspection line 351 and the common voltage transmission line 313.

the common voltage transmission line 313 is connected with the contact electrode 901 through contact holes 512, 513, wherein the contact hole 513, 513 exposes the common voltage transmission line 313.

It will be apparent to those skilled in the art that various modifications and variations can be made in the embodiments of the present invention without departing from the spirit or scope of the invention. Thus, it is intended that the present invention covers the modifications and variations of the embodiments provided they come within the scope of the appended claims and their equivalents.

What is claimed is:

1. An LCD device comprising:
   a substrate including a plurality of pixel regions defined by a plurality of gate and data lines crossing each other, wherein each pixel region includes a liquid crystal capacitor and auxiliary capacitor;
   an auxiliary voltage line supplying an auxiliary voltage to one terminal of the auxiliary capacitor formed in each pixel region, wherein the auxiliary capacitor allows an electric charge to be maintained in the liquid crystal capacitor for one frame;
   a common voltage line supplying a common voltage to the plurality of the pixel regions through a common electrode;
   an inspection line connected to the auxiliary voltage line by crossing the common voltage line;
   a sealant positioned above the inspection line; and wherein a predetermined portion of the common voltage line is removed from the crossing portion of the inspection line and the common voltage line;
   wherein a width of the common voltage line removed is greater than a width of the sealant overlying the crossing portion.

2. The LCD device of claim 1, wherein the auxiliary voltage line includes;
   a first auxiliary line positioned at one edge of the substrate;
   a second auxiliary line positioned at another edge of the substrate; and
   a plurality of third auxiliary lines connecting between the first auxiliary line and second auxiliary line.

3. The LCD device of claim 2, wherein
   the first auxiliary line and the inspection line are formed of a same material;
   the second auxiliary line, third auxiliary lines and the common voltage line are formed of a same material; and
   the first auxiliary line and the second auxiliary line are formed of different materials.

4. The LCD device of claim 3, wherein
   the first auxiliary line and the inspection line are formed of the same material as that of the data lines; and
   the second auxiliary line, third auxiliary lines and the common voltage line are formed of the same material as that of the gate lines.

5. The LCD device of claim 3, further comprising a pixel electrode formed in each pixel region, wherein each pixel electrode faces with the common electrode, a contact electrode connecting between the inspection line and one of the third auxiliary lines, wherein the contact electrode is formed of the same material as that of the pixel electrode.

6. An LCD device comprising:
   a substrate including a plurality of pixel regions defined by a plurality of gate and data lines crossing each other, wherein each pixel region includes a liquid crystal capacitor and auxiliary capacitor;
   an auxiliary voltage line supplying an auxiliary voltage to one terminal of the auxiliary capacitor formed in each pixel region, wherein the auxiliary capacitor allows an electric charge to be maintained in the liquid crystal capacitor for one frame;
   an inspection line connected to the auxiliary voltage line by crossing the common voltage line;
   a common voltage line supplying a common voltage to the plurality of the pixel regions through a common electrode, wherein a predetermined portion of the common voltage line is removed from the portion where the common voltage line and the inspection line cross,
   a contact electrode connecting across the removed portion
   a sealant positioned above the contact electrode,
   wherein a predetermined portion of the inspection line is removed from the crossing portion of the inspection line and the contact electrode;
   wherein a width of the inspection line removed is greater than a width of the sealant overlying the crossing portion.

7. The LCD device of claim 6, wherein the auxiliary voltage line includes
   a first auxiliary line positioned at one edge of the substrate,
   a second auxiliary line positioned at another edge of the substrate,
   a plurality of third auxiliary lines connecting between the first auxiliary line and second auxiliary line.

8. The LCD device of claim 7, wherein
   the second auxiliary line, the plurality of the third auxiliary lines, and the inspection line are formed of the a same material,
   the first auxiliary line, the common voltage line are formed of a same material, a pixel electrode formed in each pixel region and the contact electrode are formed of a same material.

9. The LCD device of claim 8, wherein the second auxiliary line, a plurality of the third auxiliary lines, and the inspection line are formed of the same material as that of the gate line, the first auxiliary line, the common voltage line are formed of the same material as that of the data line.

10. A liquid crystal display (LCD) device comprising:
    a plurality of gate lines and data lines formed on a first substrate, each of the gate lines and data lines defining a pixel region, wherein each pixel region includes a liquid crystal capacitor and auxiliary capacitor;
    a common voltage line in electrical communication with a common electrode;
    an auxiliary voltage line in electrical communication with the respective auxiliary capacitors, wherein each auxiliary capacitor allows an electric charge to be maintained in the liquid crystal capacitor for one frame; and
    an inspection line in electrical communication with the auxiliary voltage line, the inspection line and the common voltage line crossing each other in planes separated by a gate insulating layer so as to define a crossing region;
    a sealant formed along a portion of the first substrate and configured to seal the second and first substrates, a portion of the sealant disposed in a plane overlying the crossing region and separated from the crossing region by a non-conducting layer;
wherein a portion of the common voltage line in the crossing region is removed or omitted;
wherein a width of the common voltage line removed or omitted is greater than a width of the sealant overlying the crossing region.

11. The LCD device of claim 10, wherein the portion of the common voltage transmission line is removed or omitted to prevent a short-circuit between the common voltage line and the inspection line.

12. The LCD device of claim 10, wherein
the common electrode is formed on a second substrate; and
the common voltage line electrically communicates with the common electrode through a silver dot formed in the first substrate.

* * * * *

UNITED STATES PATENT AND TRADEMARK OFFICE
CERTIFICATE OF CORRECTION

PATENT NO. : 7,889,302 B2  
APPLICATION NO. : 11/827406  
DATED : February 15, 2011  
INVENTOR(S) : Eun Hong Kim Page 1 of 1

It is certified that error appears in the above-identified patent and that said Letters Patent is hereby corrected as shown below:

In the Claims

In column 10, claim 8, line 38, after "inspection line are formed of" delete "the".

Signed and Sealed this
Thirty-first Day of May, 2011

David J. Kappos
*Director of the United States Patent and Trademark Office*